(12) United States Patent
Klapman (10) Patent No.: US 12,461,875 B2
(45) Date of Patent: Nov. 4, 2025

(54) SMART CARD WITH BUS INTERFACE RECEPTACLE PRINTED AS PART OF PCB

(71) Applicant: Sandisk Technologies, Inc., Milpitas, CA (US)

(72) Inventor: Matthew Harris Klapman, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/232,494

(22) Filed: Aug. 10, 2023

(65) Prior Publication Data
US 2024/0220434 A1    Jul. 4, 2024

Related U.S. Application Data
(60) Provisional application No. 63/435,832, filed on Dec. 29, 2022.

(51) Int. Cl.
G06F 13/38    (2006.01)
(52) U.S. Cl.
CPC .... *G06F 13/382* (2013.01); *G06F 2213/0042* (2013.01)
(58) Field of Classification Search
CPC .................................................. G05B 23/0283
See application file for complete search history.

(56) References Cited

U.S. PATENT DOCUMENTS

| | | | | |
|---|---|---|---|---|
| 6,814,583 | B1 * | 11/2004 | Young | H01R 12/721 439/62 |
| 7,213,766 | B2 * | 5/2007 | Ryan | G06Q 20/10 235/492 |
| 7,344,072 | B2 | 3/2008 | Gonzalez et al. | |
| 7,458,825 | B2 * | 12/2008 | Atsmon | G06K 19/07732 439/78 |
| 8,203,080 | B2 * | 6/2012 | Vasoya | H05K 1/0366 174/262 |
| 9,577,392 | B2 * | 2/2017 | Chang | G06F 13/4068 |

(Continued)

FOREIGN PATENT DOCUMENTS

| | | |
|---|---|---|
| EP | 1473664 A2 | 11/2004 |
| EP | 1755072 A2 | 2/2007 |

(Continued)

*Primary Examiner* — Henry Tsai
*Assistant Examiner* — Juanito C Borromeo
(74) *Attorney, Agent, or Firm* — DENTONS Durham Jones Pinegar (57) ABSTRACT

This disclosure a smart card device that provides a bus interface, such as a USB-C bus interface, printed on a portion of a PCB that forms a base layer of the smart card device. The smart card device can provide the bus interface without having to mount a traditional socket. By leveraging the portion of the PCB to provide a printed bus interface and excluding the traditional socket, the bus interface can be easily manufactured using well-known PCB manufacturing techniques while significantly reducing manufacturing costs. Furthermore, the smart card device can have a thickness that conforms to known card form factor standards, enabling the smart device to fit within a standard wallet. To enhance durability of the portion of the PCB from wear-and-tear, a metal core can be added to the PCB as an additional layer. The portion may also be reinforced with edge plating.

20 Claims, 4 Drawing Sheets

(56) References Cited

U.S. PATENT DOCUMENTS

| | | | |
|---|---|---|---|
| 10,824,698 B2 | 11/2020 | Ross | |
| 11,037,152 B2 | 6/2021 | Davenport | |
| 2008/0071963 A1* | 3/2008 | Chow | G06F 13/409 |
| | | | 711/E12.008 |
| 2009/0294792 A1 | 12/2009 | Lee et al. | |

FOREIGN PATENT DOCUMENTS

| KR | 20000033877 A | 6/2000 |
|---|---|---|
| KR | 100984137 B1 | 9/2010 |

* cited by examiner

PRIOR ART

SMART CARD WITH BUS INTERFACE RECEPTACLE PRINTED AS PART OF PCB

CROSS-REFERENCE TO RELATED APPLICATION(S)

This application claims the benefit of U.S. Provisional Patent Application No. 63/435,832, filed Dec. 29, 2022, entitled "SMART CARD WITH BUS INTERFACE RECEPTACLE PRINTED AS PART OF PCB," which is hereby expressly incorporated by reference herein in its entirety for all purposes.

BACKGROUND

Field

One or more embodiments of the invention relate generally to smart card devices/systems and more particularly, for example, to systems and methods for smart card devices that can connect to external devices via bus interfaces.

Description of Related Art

Over the years, card technology has expanded utility and security in retail, e-commerce, and banking applications. From simple credit cards that stored banking information on traditional magnetic stripe to various smart cards that provides enhanced security and contactless transactions with integrated circuits (ICs), card devices have come to offer ever increasing breadth of functionality. Today, smart cards can act as a miniature computer with its own processor/memory architecture and/or as a secure storage device. However, offering expanded features while maintaining the familiar form factor of a card fitting in a standard wallet has provided challenges that hampered further expansion of the card's acceptance and utility.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

Embodiments of the invention and their advantages are best understood by referring to the detailed description that follows. It should be appreciated that like reference numerals are used to identify like elements illustrated in one or more of the figures.

DETAILED DESCRIPTION

The following detailed description, which references to and incorporates the drawings, describes and illustrates one or more specific embodiments of what is claimed. These embodiments, offered not to limit but only to exemplify and teach the invention, are shown and described in sufficient detail to enable those skilled in the art to practice the invention defined by the claims. Thus, where appropriate to avoid obscuring the invention, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

The present disclosure relates to a card device (e.g., a smart card device) mainly with storage, such as a common flash drive or one with encrypted storage, etc., in a new form factor. The form factor of the card device can be in accordance with one or more physical characteristic standards, such as CR 80, ISO/IEC 7810, ISO/IEC 7816 standards. Specifically, the card device can have physical dimensions of a standard credit card such that the card device can fit in a standard wallet. The card device may include a memory device, a microprocessor, a bus interface, a battery, a wireless transmitter/receiver, or other electric components.

The card device can be configured as a USB thumb drive or a solid state drive (SSD) with its memory device and microcontroller to provide storage and access of data, with or without encryption. With its bus interface or wireless transmitter/receiver, the card device can connect to an external device to support wired or wireless transactions between the card device and the external device. The data and transactions may include cryptocurrency (e.g., the card device is a crypto wallet) and/or non-fungible token (NFT) data.

Additionally, the card device can be configured to provide "find my lost device" functionality. Its battery can be charged through the bus interface or via a wireless power source (e.g., solar panel or inductive charging component). If the card device is lost, the card device can determine its location with its wireless receivers (e.g., triangulation with cellular receivers or global positioning receiver) and transmit the location. Various novel solutions are disclosed herein in order to enhance connectivity and durability of the card device.

Figure 1A:
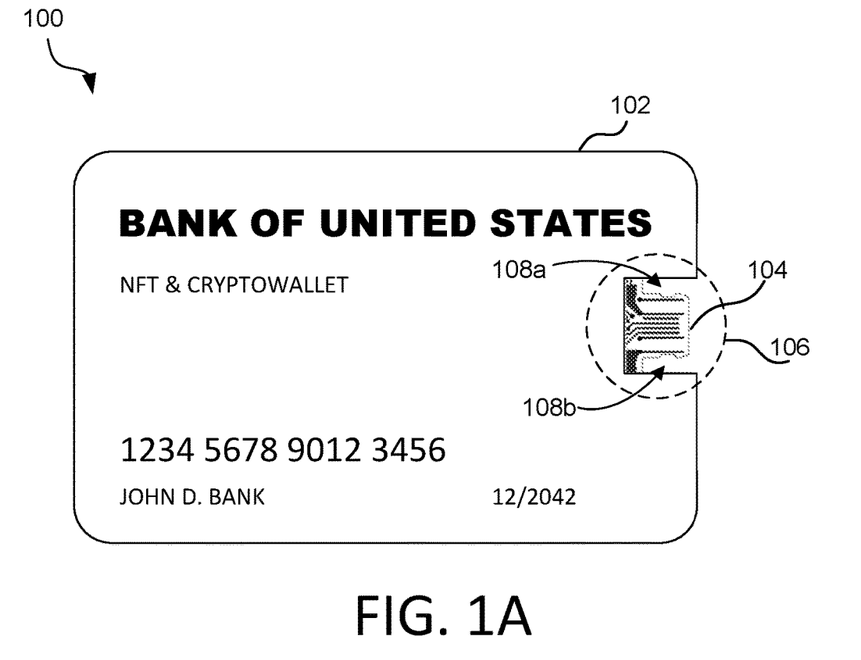
FIGS. 1A-1B illustrate examples of smart card device configurations, in accordance with embodiments of the disclosure.
Figure 1B:
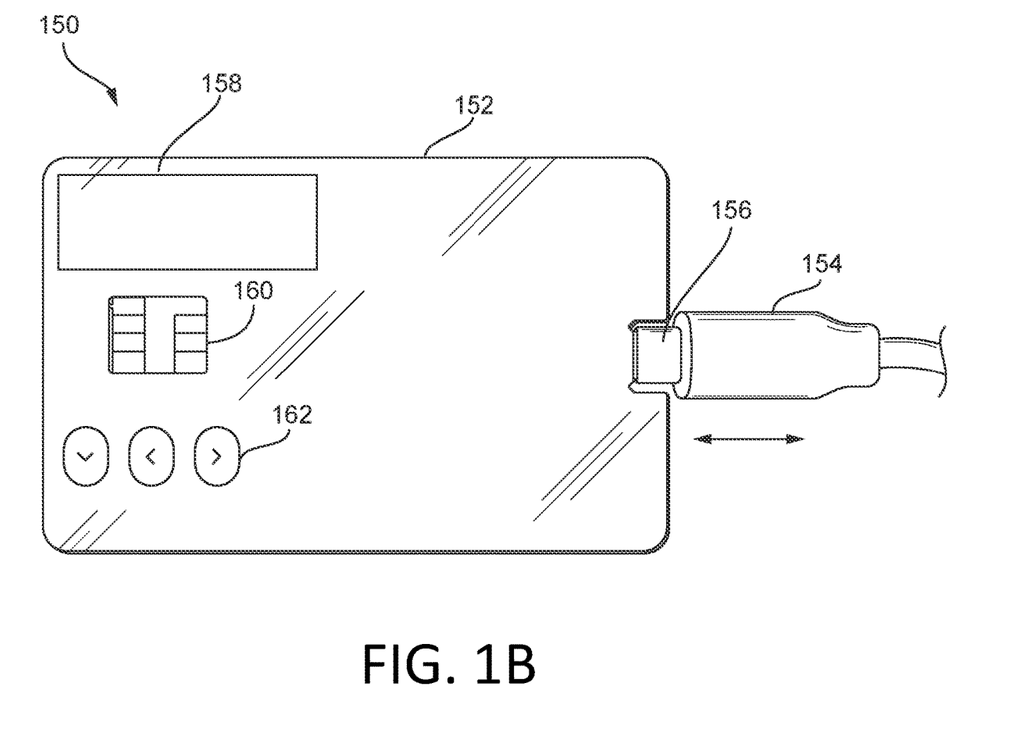

FIGS. 1A-1B illustrate examples of smart card device configurations 100, 150, in accordance with one or more embodiments of the disclosure. Card devices disclosed in the present disclosure can substantially conform to a physical characteristic standard of a card. For example, card devices 102, 152 illustrated in FIGS. 1A-1B may conform to ISO/IEC 7810 ID-1 associated with banking and identification (ID) cards having physical dimensions of 85.60 by 53.98 mm with a thickness between 0.68 and 0.84 mm. Furthermore, the card devices 102, 152 can be smart card devices with their circuits printed on a printed circuit board (PCB) and their components mounted on the PCB. For the card devices 102, 152 to satisfy the physical dimensions, the PCB may be manufactured with thickness options including 0.2 mm, 0.4 mm, 0.5 mm, 0.6 mm, 0.8 mm, or anywhere between.

FIG. 1A illustrates the card device 102 in a detached configuration 100 where a tab member (also referred as a tongue in literature) 104 of the card device 102 is decoupled from a connector/plug of an external device. As illustrated, a bus interface of a wired electrical standards of USB 1, USB 2, USB 3, USB-C, Micro USB, Lightning, or other standards can be provided on the tab member 104. The tab member 104 can be shaped to receive a corresponding plug of the bus interface.

The tab member 104 can be positioned within, or surrounded by, a recessed portion/cutout 106 that reveals the tab member 104. The recessed portion 106 can house the tab member 104 such that the tab member 104 protrudes/extends from within the recessed portion 106 toward an edge of the card device 102. Additionally, the recessed portion 106 can be shaped to form spaces 108*a-b* between walls of the recessed portion 106 and the tab member 104. The spaces 108*a-b* can enable coupling/reception of a connector/plug having an opposite gender (e.g., male to female or female to male) on the tab member 104. In some embodiments, the spaces 108*a-b* can have dimensions that would enable a connector fit that is snug or tight at the walls of the recessed portion 106.

The size and positioning of the recessed portion 106 and the tab member 104 relative of the recessed portion 106 can be such that the card device 102, as a whole, remains within the physical dimensions of a physical characteristic standard. For example, the card device 102 can conform to the physical dimensions of ISO/IEC 7810 ID-1.

FIG. 1B illustrates the card device 152 in an attached configuration 150. The card device 152 can be the same or a similar card device as the card device 102 of FIG. 1A but with an external device connected to the card device 152 via a connector 154. The card device 152 has a tab member, such as the tab member 104 of the card device 102, which is hidden from view by a connector enclosure 156 of the connector 154. As illustrated, various smart card components can be provided on the card device 152 including an NFC component 158, a contact pad layout 160, buttons 162, a display (not shown), a microprocessor (not shown), a memory (not shown), or the like. In some embodiments, upon connection to the external device, the microprocessor may provide a bus interface device driver to the external device based on a determination that the card device is coupled to the external device.

Figure 2:
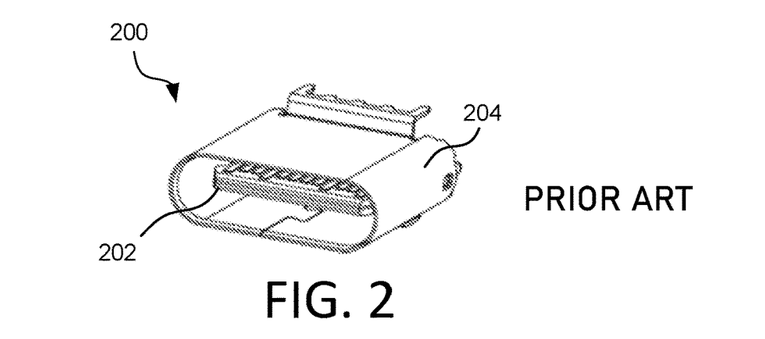
FIG. 2 illustrates a prior art mountable USB-C type receptacle, in accordance with one or more embodiment of the disclosure.

FIG. 2 illustrates a prior art mountable USB-C type receptacle 200, in accordance with one or more embodiment of the disclosure. The receptacle 200 can be mounted on a PCB (not shown) to provide a bus interface. For example, the receptacle 200 can be solder-mounted on a PCB to provide a USB-C bus interface to a card device. The receptacle 200 includes a tab member 202 and a tab enclosure 204. The tab member 202 may have the same physical dimensions as the tab member 104 of FIG. 1A but it is not printed on a PCB of the card device. For multiple reasons, it can be undesirable to mount such receptacle 200 on a card device to provide a bus interface.

From size perspective, the tab enclosure 204 of the receptacle 200 can be too bulky or thick for a card device to satisfy required physical dimensions. For example, a USB-C type plug has a thickness dimension of 2.4 mm, which significantly exceeds the ISO/IEC 7810 ID-1 maximum specified thickness of 0.84 mm. Thus, a card device with a solder-mounted receptacle, such as the receptacle 200, cannot readily fit within a wallet. In contrast, the tab member 104 of FIG. 1A can exclude the tab enclosure 204 to provide the card devices 102, 152 a more compact and flat form factor that adheres to physical dimensions of a card standard.

From cost perspective, the receptacle 200 is another separate component that adds extra cost for a card device. The acquisition of the receptacle 200, mounting the receptacle 200, and verifying electrical connections can add significant cost and delay to a card device manufacturing process.

Referring back to FIGS. 1A-1B, the card devices 102, 152 of FIGS. 1A-1B address the above size and cost challenges by printing a bus interface on a portion of the PCB of the card devices 102, 152 as a part of the PCB. The PCB can form a base layer on which the bus interface can be printed and other components including a microprocessor, a memory, or a near-field communication (NFC) chip can be mounted. The tab member 104 excludes the tab enclosure 204 to satisfy the thickness dimension and, further, removes a need to mount the bus interface. Advantageously, the bus interface can be printed during a standard PCB printing process and can greatly save cost and reduce manufacturing time.

Figure 3:
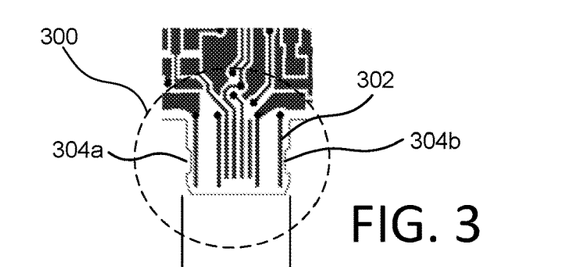
FIG. 3 illustrates an example tab member of a smart card device, in accordance with one or more embodiment of the disclosure.

FIG. 3 illustrates an example tab member 300 of a smart card device, in accordance with one or more embodiment of the disclosure. The tab member 300 can be the same or a similar tab member as the tab member 104 of FIG. 1A. As described, the tab member 300 can be a part of a PCB of a card device and can include a bus interface 302 printed on a portion of the PCB forming the tab member 300. In some embodiments, the tab member 300 can feature one or more indents 304*a-b* on its sides. The indents 304*a-b* can couple with side-latches (not shown) provided inside a plug to mechanically secure the plug when the plug is coupled to the tab member including the bus interface 302.

FIGS. 4A-4D illustrate example views 400, 420, 440, 460 of a smart card device, in accordance with one or more embodiments of the disclosure. A first view 400 is a sectional view that illustrates a PCB 402. As illustrated with the card device 102, the PCB 402 can have a recessed portion 406 in which a tab member 404 can extend or protrude. The tab member 404 can correspond to the tab member 300 of FIG. 3.

Figure 4A:
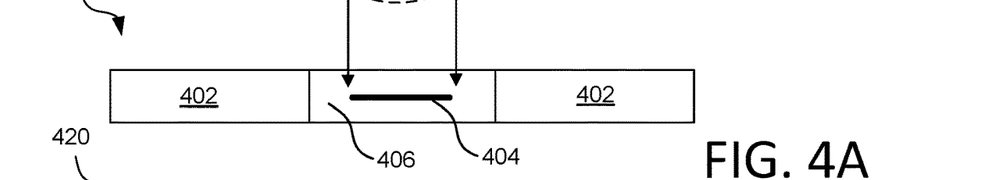
FIGS. 4A-4D illustrate example views of a smart card device, in accordance with embodiments of the disclosure.
Figure 4B:
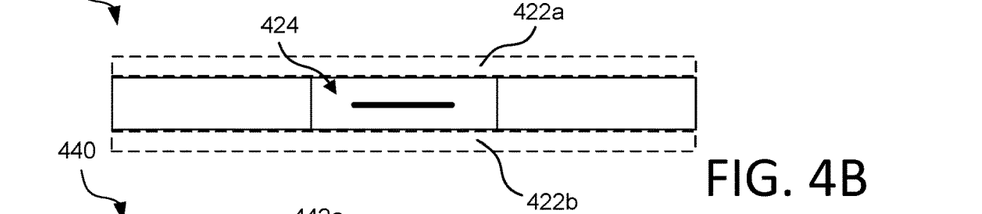

A second view 420 is a sectional view that illustrates one or more design layers 422*a-b* optionally disposed over the PCB 402. As illustrated with the card device 102 of FIG. 1A, the design layers 422*a-b* can convey various information associated with the card device 102. In some embodiments, the design layers 422*a-b* can form an enclosure 424 that can provide retaining force on top and bottom of a connector enclosure of a plug (e.g., a connector enclosure 156 of FIG. 1B) to mechanically secure the plug when the plug is coupled to the tab member 404. In these embodiments, when seen with a top view associated with the views of the card devices 102, 152 of FIGS. 1A-1B, the tab member 404 can be hidden from view by the design layers 422*a-b*.

Figure 4C:
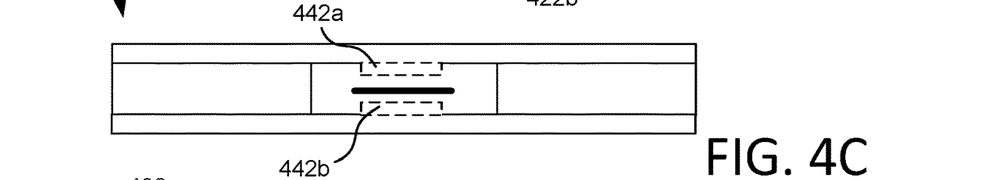

A third view 440 is a sectional view that illustrates one or more optional spring clips (e.g., spring fingers, spring tips, etc.) 442*a-b* disposed within the design layers 422*a-b*. The spring clips 442*a-b* can have various forms including a mainly flat shaped clip spring clip with a small, curved lip that can add friction on either top and/or bottom of a connector enclosure of a plug (e.g., a connector enclosure 156 of FIG. 1B) to mechanically secure the plug when the plug is coupled to the tab member 404.

Figure 4D:
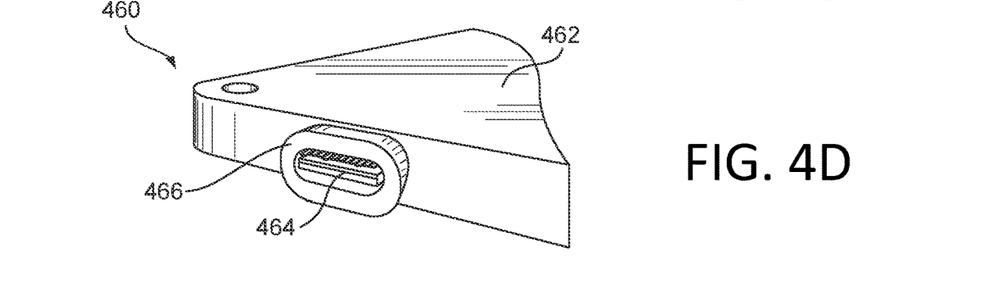

A fourth view 460 is a perspective view that illustrates the PCB 402 mounted on/in a housing 462. The housing 462 can be disposed on one side of the PCB 402 or completely (or substantially completely) enclose the PCB 402. The housing 462 can be made of various materials including molded plastic or metal, where a portion of the housing 462 surrounding a tab member 464 on the PCB 402 can be shaped to form a tab enclosure 466. For example, the fourth view 460 shows the tab enclosure 466 as an oval-shaped USB-C type enclosure that can hold a coupled USB-C plug firmly in place. In some embodiments where the housing 462 is made of metal, the housing 462 can shield high speed bus signal (e.g., USB signal) emissions from emanating outside of the housing 462 to avoid radio interference. Further, such housing 462 made of metal may also prevent outside electromagnetic interference from affecting the high speed bus signal.

Figure 5:
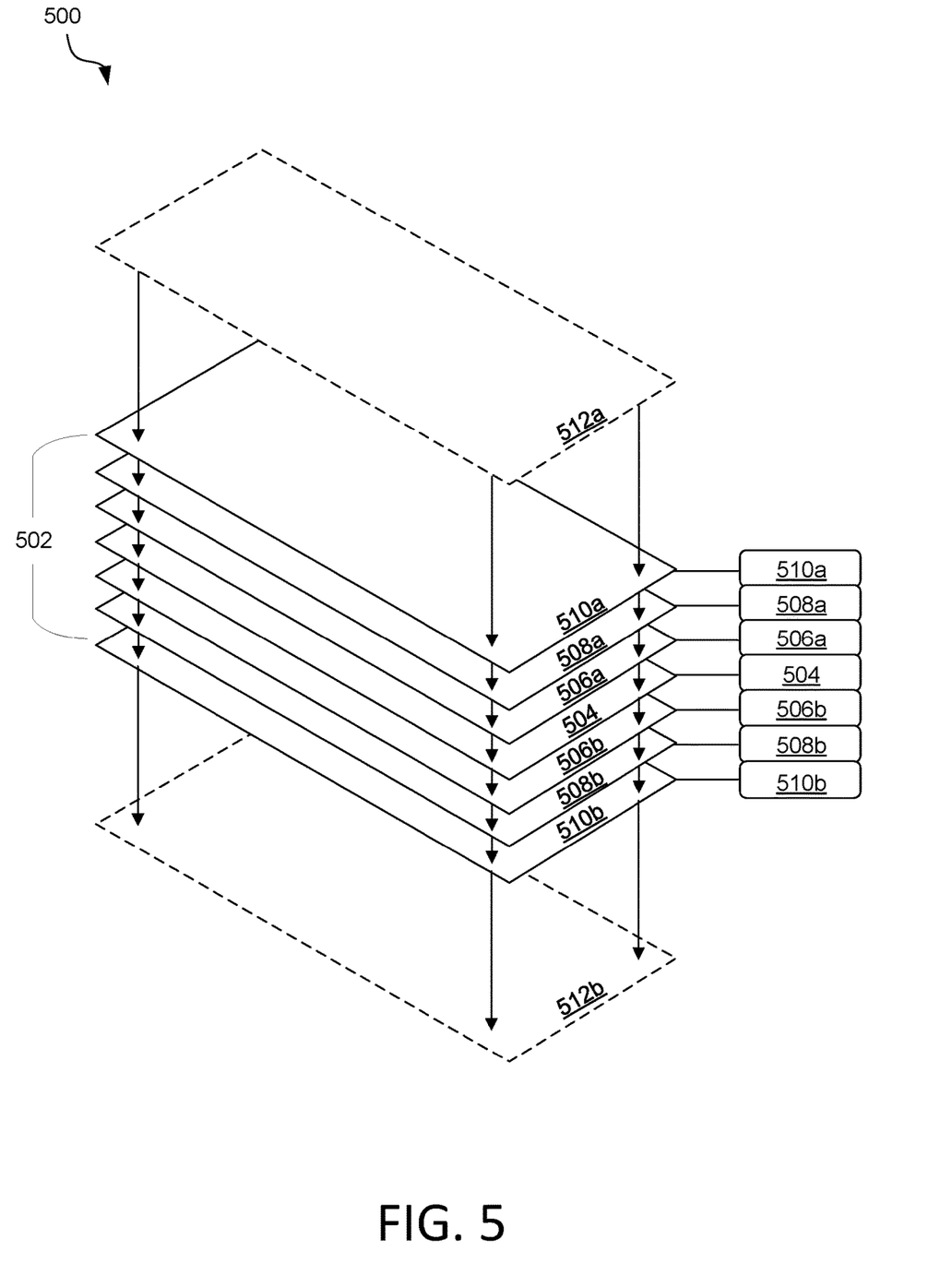
FIG. 5 illustrates example layers of a smart card device, in accordance with one or more embodiment of the disclosure.

FIG. 5 illustrates example layers 500 of a smart card device, in accordance with one or more embodiment of the disclosure. When a tab member is formed as part of a PCB forming a card device, the tab member shares the same layers of the PCB. Thus, the tab member can include a base layer composed of flame retardant (FR-4) epoxy-laminate material that is a standard base layer of a typical PCB. Such tab member sharing standard PCB layers can be prone to wear-and-tear and pose some durability concerns. For instance, the FR-4 material may not withstand hundreds or thousands of attach and detach actions of a plug on the tab member. Specifically, the PCB around indentations (e.g., the indentations 304a-b) can wear out and provide little to no retaining force on a plug. Furthermore, the tab member may buckle or break through repeated attach and detach actions and render some or all features of the card device unusable.

The present disclosure provides a layering technique that adds a reinforcing layer 504 to a PCB 502 to address the durability issue. A standard PCB manufacturing process can be expanded to include adding the reinforcing layer 504. The reinforcing layer 504 can be composed of a metal that can include, but is not limited to, aluminum or steel. The metal can be any metal that can withstand buckling force and/or wear-and-tear better than the epoxy resin. In some embodiments, the metal can be a metal having the same or greater hardness than aluminum on the Rockwell hardness scale.

Advantageously, the reinforcing layer 504 made of metal (e.g., a metal layer) may also be used to balance, transfer, or disperse heat on the card device during extensive or prolonged use. For example, the metal layer can transfer heat from hot spots to cooler areas to smooth out thermal profile of the card device during electrical use. In some instances, the metal layer may also serve as an electrical ground or, alternatively, as a power plane.

In the PCB 502, an epoxy resin layer (e.g., a FR-4 layer) 506a can be disposed on a side of the reinforcing layer 504. Additionally, a conducting material layer 508a, such as a copper layer, can be disposed on the epoxy resin layer 506a. Further, a solder mask and/or a gold plating layer(s) 510a can be disposed on the conducting material layer 508a. Optionally, another epoxy resin layer 506b, another conducting material layer 508b, and another solder mask and/or a gold plating layer(s) 510b can be layered on the other side of the reinforcing layer 504 to mirror the layering of the epoxy resin layer 506a, the conducting material layer 508b, and the solder mask and/or a gold plating layer(s) 510a on the side.

The added reinforcing layer 504 can significantly increase durability of a tab member by providing a hardened core to the tab member that can withstand wear-and-tear caused by attaching and detaching a plug to the tab member. In some embodiments, optionally, one or more design layers 512a-b can be further layered on either side of the PCB to visually enhance and to provide additional strength to the PCB. The illustrated PCB 502 stack-up is exemplary and it will be understood that the PCB 502 can have different stack-ups with additional layers of different materials or fewer layers with some removed layer(s).

In some embodiments, edge plating (e.g., castellation, border plated, plated contour, side metal, etc.) can be employed to additionally, or alternatively, reinforce the tab member. That is, edges and/or sides of the tab member can be plated with metal including copper, steel, or any metal having greater hardness than FR-4 material to provide extra strength against wear-and-tear.

Figure 6:
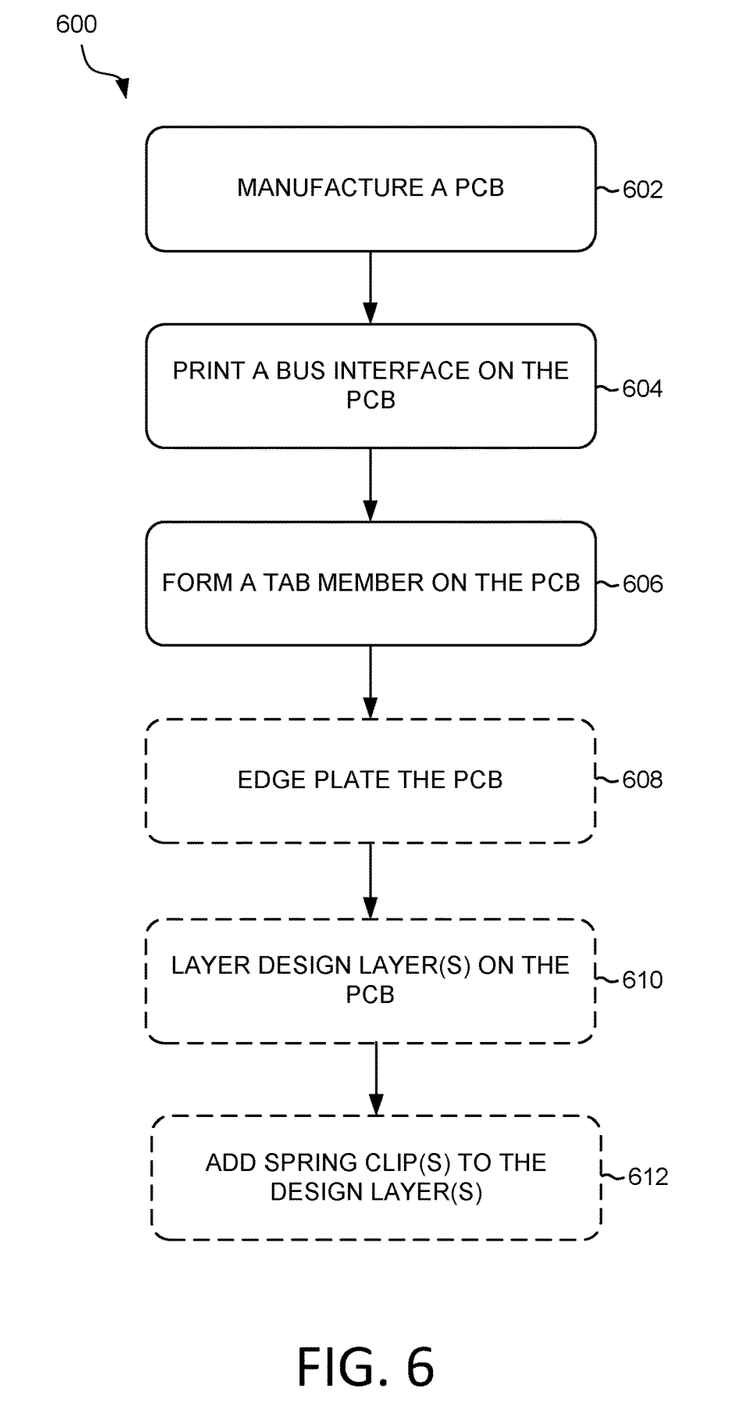
FIG. 6 illustrates an example process of manufacturing a smart card device, in accordance with one or more embodiment of the disclosure.

FIG. 6 illustrates an example process 600 of manufacturing a smart card device, in accordance with one or more embodiment of the disclosure. At block 602, a PCB can be manufactured. The PCB can lay at least one reinforcing layer as a core of the PCB during the manufacturing process. The reinforcing layer can be a metal layer having a hardness characteristic greater than FR-4 material.

At block 604, as part of the PCB manufacturing process, a bus interface can be printed on the PCB. The bus interface can conform to USB 1, USB 2, USB 3, USB 4, USB-C, Micro USB, Lightning, or any other standard can be provided. As a preferred embodiment, a USB-C bus interface can be printed.

At block 606, a tab member can be formed on the PCB. The forming of the tab member may involve cutting the PCB into a card device having a defined physical dimension of a card device or selecting the PCB that already has the defined physical dimensions. Additionally, the forming of the tab member can involve cutting or otherwise forming a recessed portion (e.g., the recessed portion 106 of the card device 102 in FIG. 1A) and, similarly, cutting or otherwise shaping the tab member.

At block 608, optionally, the PCB shaped by the above steps can be edge plated to reinforce the tab member.

At block 610, design layer(s) can be layered on the PCB. The design layer may visually enhance the PCB and, as described in relation to FIG. 4B, provide additional retaining force to a plug when the plug is coupled to the tab member.

At block 612, spring clip(s) can be added to the design layer(s). The spring clip(s) can, as described in relation to FIG. 4C, provide additional retaining force to the coupled plug.

The present disclosure described a flat USB-C socket (e.g., the tab member) that can be easily manufactured using well-known PCB manufacturing techniques. The flat USB-C socket can enable a smart card device to have a thickness that is approximately 0.7 mm, which can satisfy ISO/IEC 7810 ID-1 requirements. The flat USB-C socket can be a part of a PCB forming the smart card device and, by leveraging the PCB, significantly lower the cost of USB-C sockets in products in providing USB-C functionality. Further, techniques to reinforce the flat USB-C socket with a PCB stack-up integrating a metal core and/or edge plating were described. Accordingly, the present disclosure can enable new form factors for existing card-like devices including storage devices. More specifically, the present disclosure can enable a hardware wallet product to be created that is in the shape of a standard credit card. Furthermore, the present disclosure enables reduction of the cost of various products that incorporate a USB-C socket.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled" can refer to two or more elements that may be either directly connected or connected by way of one or more intermediate elements. Components discussed herein can be coupled in a variety of manners, such as through a conductive material. Additionally, the words "herein," "above," "below," and words of similar import, when used in this disclosure, shall refer to this application as a whole and not to any particular portions of this application. Where the context permits, words in the above Description using the singular or plural number may also include the plural or singular number respectively.

The above description of embodiments of the disclosure is not intended to be exhaustive or to limit the disclosure to the precise form disclosed above. While specific embodiments, and examples, are described above for illustrative purposes, various equivalent modifications are possible within the scope of the disclosure, as those skilled in the relevant art will recognize. For example, while processes or blocks can be presented in a given order, alternative embodiments can perform routines having steps, or employ systems having blocks, in a different order, and some processes or blocks can be deleted, moved, added, subdivided, combined, and/or modified. Each of these processes or blocks can be implemented in a variety of different ways. Also, while processes or blocks are at times shown as being performed in series, these processes or blocks can instead be performed in parallel or can be performed at different times.

The features described herein can be applied to other systems, not necessarily the system described above. The elements and acts of the various embodiments described above can be combined to provide further embodiments.

In some embodiments, the methods and/or systems discussed herein can be implemented at least in part by control circuitry and/or memory. For example, memory can store executable instructions that, when executed by control circuitry, cause the control circuitry to perform operations discussed herein. Additionally, or alternatively, other methods and/or systems discussed herein can be implemented at least in part with control circuitry and memory storing executable instructions.

Control circuitry can include one or more processors, such as one or more central processing units (CPUs), one or more microprocessors, one or more graphics processing units (GPUs), one or more digital signal processors (DSPs), and/or other processing circuitry. Alternatively, or additionally, control circuitry can include one or more application specific integrated circuits (ASIC), one or more field-programmable gate arrays (FPGAs), one or more program-specific standard products (ASSPs), one or more complex programmable logic devices (CPLDs), and/or the like. Control circuitry can be configured to execute one or more instructions stored in memory to thereby perform one or more operations to implement various functionality discussed herein.

Memory can include any suitable or desirable type of computer-readable media. For example, computer-readable media can include one or more volatile data storage devices (DSDs), non-volatile data storage devices, removable data storage devices, and/or nonremovable data storage devices implemented using any technology, layout, and/or data structure(s)/protocol, including any suitable or desirable computer-readable instructions, data structures, program modules, or other types of data. Computer-readable media that may be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

While some embodiments have been described, these embodiments have been presented by way of example only, and are not intended to limit the scope of the disclosure. Indeed, the methods and systems described herein can be embodied in a variety of other forms; furthermore, various omissions, substitutions and changes in the form of the methods and systems described herein can be made without departing from the spirit of the disclosure. Claims and their equivalents are intended to cover such forms or modifications as would fall within the scope and spirit of the disclosure.

What is claimed is:

1. A card device, comprising:
   a base layer having a printed circuit board (PCB) and defining a recessed portion, the PCB including:
   a tab extending from the PCB and at least partially contained within the recessed portion and shaped to be received within a plug associated with an external device; and
   a bus interface printed on the tab, the bus interface enabling communication between the card device and the external device; and
   a microprocessor mounted on the PCB and electrically coupled to the bus interface.

2. The card device of claim 1, further comprising at least one design layer disposed over at least a portion of the base layer.

3. The card device of claim 2, wherein a combined thickness of the base layer and the at least one design layer conforms with physical dimensions selected from at least one of ID-1, CR 80, ISO 7810, and ISO 7816.

4. The card device of claim 1, wherein the microprocessor is configured to:
   determine that the bus interface is coupled to the external device; and
   provide a device driver to the external device over the bus interface.

5. The card device of claim 1, wherein the tab includes at least one of (i) an indent on a side or (ii) indents on both sides of the tab shaped to mechanically secure the plug responsive to the tab being received within the plug.

6. The card device of claim 1, wherein a portion of the PCB that forms the tab has a reinforcing layer disposed on an epoxy-laminate material layer.

7. The card device of claim 6, wherein the reinforcing layer comprises a metal that has hardness equivalent or greater than aluminum on Rockwell hardness scale.

8. The card device of claim 1, wherein the tab is edge plated.

9. The card device of claim 1, wherein the card device includes one or more spring clips that provide a retaining force on the plug to mechanically secure the tab within the plug.

10. The card device of claim 1, wherein the card device is configured as at least one of a USB thumb drive, a solid state drive (SSD), a cryptocurrency wallet, or a storage for non-fungible token (NFT) data.

11. A method of manufacturing a card device, comprising:
printing a bus interface on a printed circuit board (PCB) of the card device, the bus interface supporting communication with a device external to the card device;
forming an aperture within the PCB in which a portion of the PCB associated with the bus interface is formed as a tab that is at least partially contained within the aperture and shaped to receive a plug of the device external to the card device; and
mounting a microprocessor on the PCB.

12. The method of claim 11, further comprising:
manufacturing the PCB to include a reinforcing metal layer on an epoxy-laminate material layer such that the tab includes the reinforcing metal layer.

13. The method of claim 12, wherein the reinforcing metal layer is configured as at least one of an electrical ground, a power plane, or a heat transfer mechanism.

14. The method of claim 11, wherein the card device conforms with physical dimensions selected from at least one of ID-1, CR 80, ISO 7810, and ISO 7816.

15. The method of claim 11, further comprising:
enclosing the PCB in a plastic housing, wherein a portion of the plastic housing forms a USB-C type tab enclosure for the tab.

16. A card device, comprising:
a base layer having a printed circuit board (PCB) and defining a recessed portion, the PCB including:
a member at least partially contained within the recessed portion and for coupling with a plug associated with an external device, the member having a thickness that is less than a thickness of the card device; and
a bus interface printed on the member configured to support communication with the external device; and
a microprocessor mounted on the PCB.

17. The card device of claim 16, wherein the member defines one or more indents.

18. The card device of claim 16, wherein the bus interface is printed on the member during a PCB printing process.

19. The card device of claim 16, wherein the member is edge plated.

20. The card device of claim 16, wherein the member comprises a reinforcing layer.

* * * * *